United States Patent [19]
Dubay

[11] Patent Number: 5,472,235
[45] Date of Patent: Dec. 5, 1995

[54] NIGHT-VISIBLE OCCUPANT RESTRAINT FOR VEHICLES

[76] Inventor: Eugene L. Dubay, P.O. Box 1374, Pigeon Forge, Tenn. 37868

[21] Appl. No.: 238,469

[22] Filed: May 5, 1994

[51] Int. Cl.⁶ ................................................. B60R 21/16
[52] U.S. Cl. ....................................... 280/808; 280/801.1
[58] Field of Search .................................. 280/801.1, 808

[56] References Cited

U.S. PATENT DOCUMENTS

| | | | |
|---|---|---|---|
| 4,365,285 | 12/1982 | Brundidge | 362/32 |
| 4,703,542 | 11/1987 | Hirata et al. | 24/641 |
| 4,823,239 | 4/1989 | Doty | 362/75 |
| 5,149,189 | 9/1992 | Kawamura | 362/108 |

Primary Examiner—Kenneth R. Rice
Attorney, Agent, or Firm—Pitts & Brittian

[57] ABSTRACT

An occupant restraint system for use in vehicles wherein at least a portion of the restraint system is visible at night. This permits observing compliance with governing safety laws and principles. The restraint system specifically utilizes a material in association with restraint belts that becomes illuminated such that the belts are readily visible. The material that provides the visibility is material applied to, or made a part of, the restraint belt, particularly a portion of the shoulder harness portion thereof. Materials that include reflective substances, phosphorescent substances and/or fluorescent substances are utilized. Further, fiber optic elements can be incorporated that are illuminated from a light source.

14 Claims, 2 Drawing Sheets

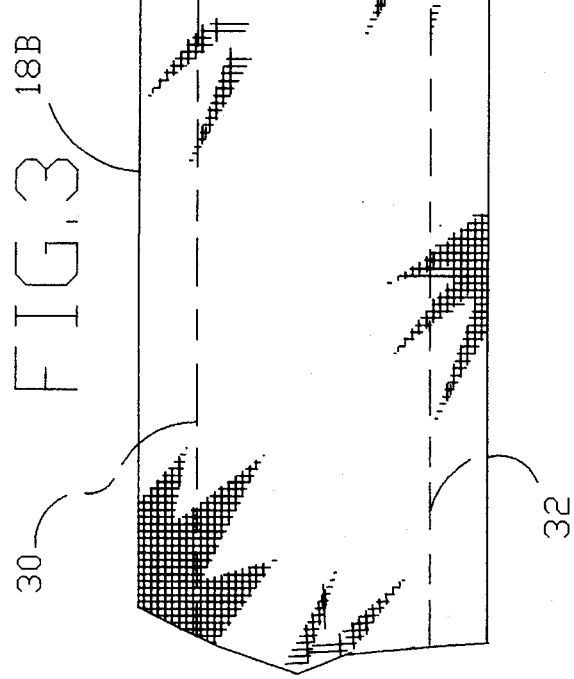
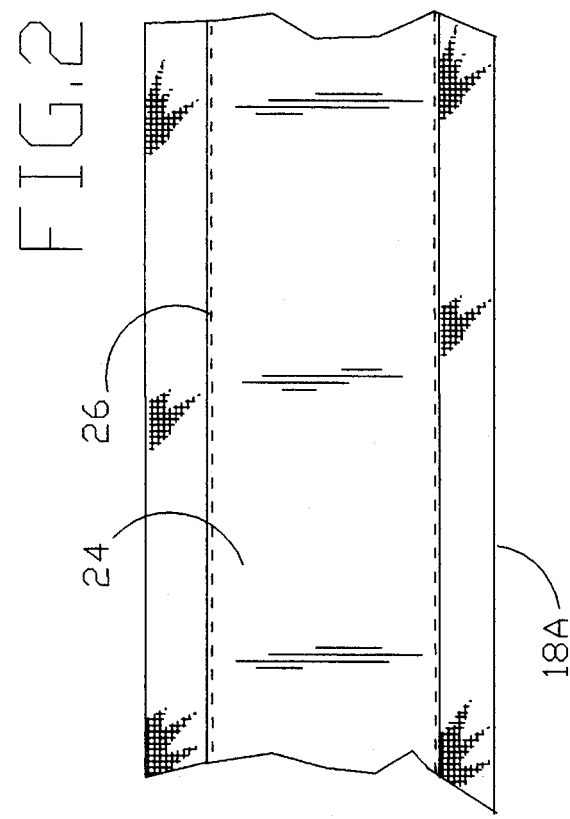
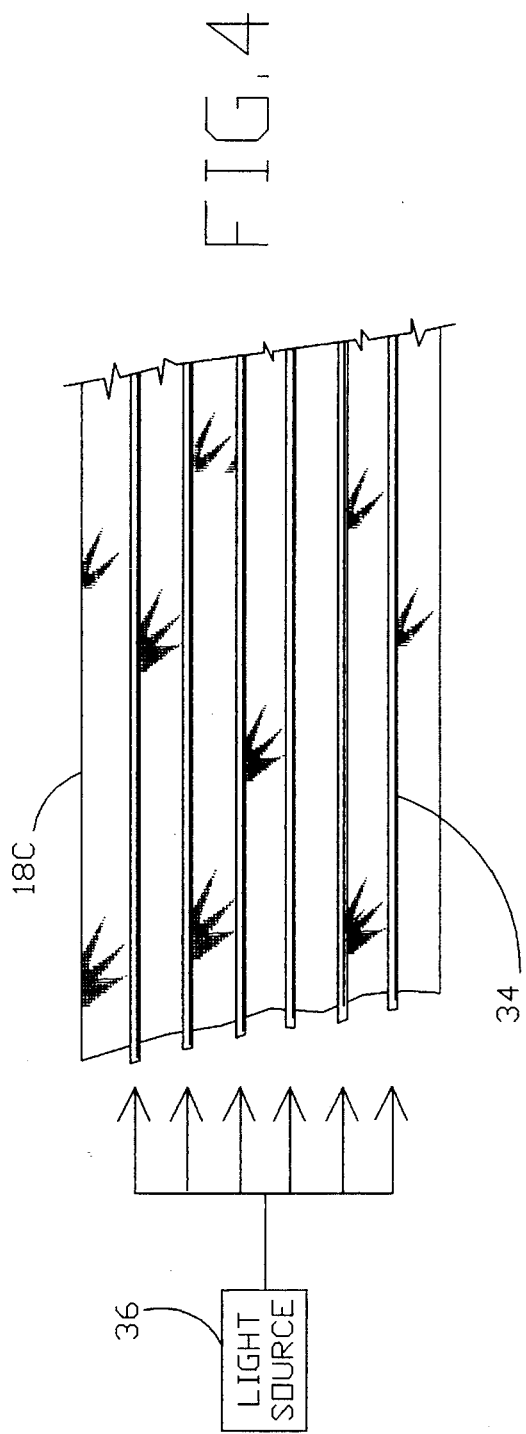

NIGHT-VISIBLE OCCUPANT RESTRAINT FOR VEHICLES

TECHNICAL FIELD

The present invention relates generally to personnel safety restraint belts for vehicles, and more particularly to a safety restraint belt that is visible under night conditions.

BACKGROUND ART

The traffic laws of most of the United States include a requirement that front seat occupants of passenger cars wear approved seat belts. Further, this requirement is carried over into light trucks in some states. Not only are there laws requiring such usage, statistics are available demonstrating that the wearing of the seat belts substantially reduces traffic deaths. For this reason, rear seat occupants should also utilize the belts. Thus, it is desirable that a driver, for example, can quickly observe compliance of wearing seat belts by other passengers. The laws in various states differ in the requirement and enforcement. In some states, drivers can be stopped and charged with a violation when observed operating a vehicle when seat belts are not being utilized. The laws in other states permit charging the occupants with a violation only when the vehicle is stopped for some other reason. Under either condition, it is desirable that law enforcement personnel can quickly discern the presence or absence of a safety belt on the occupants.

Most occupant restraint belts, typically referred to as seat belts, usually include a shoulder harness and have a color that is compatible with the interior color of the vehicle, e.g., the conventional belts are usually black, dark blue, deep red and other dark colors. Thus, at night it is difficult to ascertain the use of seat belts by occupants either by the driver or the law enforcement personnel.

Accordingly, it is an object of the present invention to provide a vehicle seat belt construction that is readily seen, even at night.

It is another object of the present invention to provide a seat belt having reflective material such that light shining thereon will clearly identify when a seat belt is being worn by occupants of a vehicle.

A further object of the present invention is to provide a vehicle seat belt wherein the fibers of the belt contain reflective material such that light shining on the belt will clearly define the presence of a seat belt.

Another object of the present invention is to provide a vehicle seat belt into which are incorporated fiber optic elements that, when illuminated, will clearly define the presence of a seat belt.

These and other objects of the present invention will become apparent upon a consideration of the drawings referred to hereinafter, and a full description thereof that follows.

SUMMARY OF THE INVENTION

In accordance with the principle of the present invention, there is provided a vehicle personnel restraint (seat strap and/or shoulder harness) that can be readily seen at night. In certain of the embodiments of the invention, the observance is enhanced by incorporating a reflective material either on or within the restraint. Thus, when any light is directed against the restraint, the presence of the restraint (and its location) are readily seen. The "active" material for enhancing observance can also be fluorescent or phosphorescent materials. In another embodiment, fiber optic elements are included in the restraint which are illuminated from a light source. With all of the embodiments, other occupants of the vehicle can ascertain compliance with traffic laws at night. Further, law enforcement officers can observe compliance.

BRIEF DESCRIPTION OF THE DRAWINGS

FIG. 2 is a fragmentary drawing illustrating one embodiment of the present invention.

FIG. 3 is a fragmentary drawing illustrating another embodiment of the present invention.

FIG. 4 is a fragmentary drawing illustrating still another embodiment of the present invention.

BEST MODE FOR CARRYING OUT THE INVENTION

Figure 1:
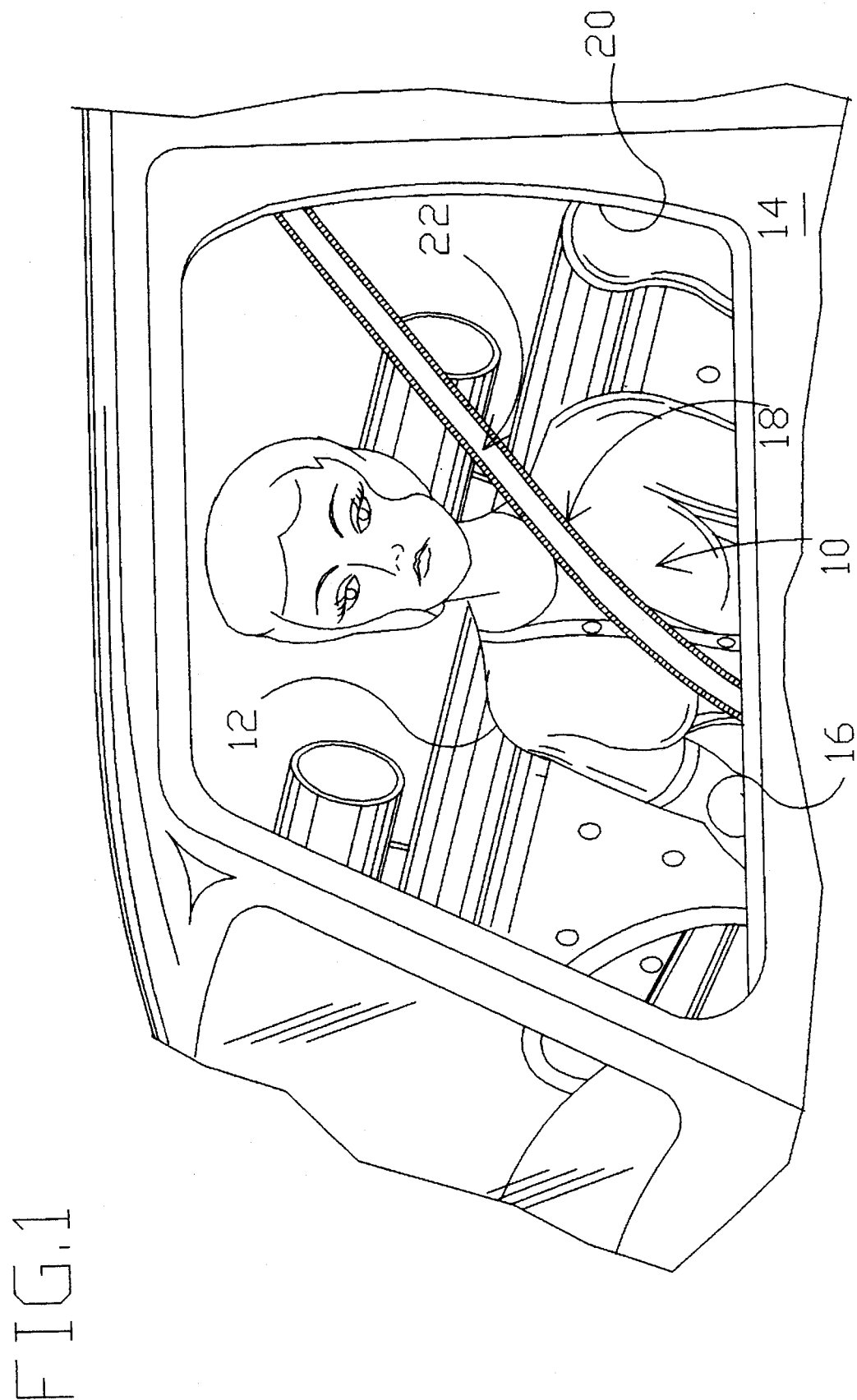
FIG. 1 is a drawing illustrating use of a restraint of the present invention by an occupant of a vehicle.

The present invention can be understood by reference to FIG. 1. Shown generally at 10 therein is a personal restraint unit. The restraint 10 is shown being used by a driver 12 of a vehicle 14, as viewed through the window opening 16 of the vehicle 14. In general structure, the restraint 10 is similar to that conventionally utilized in the vehicle 14; namely, there is a shoulder harness 18 that depends from the side 20 of the interior of the vehicle 14, with a releasable fastener (not shown) to the right of the driver 12 to engage and disengage the harness 18. Although not shown, the restraint 10 normally has a lap belt that is usually moved into or out of position simultaneously with the shoulder harness 18. The distinction of the present invention over restraints of the prior art is that at least a portion of the shoulder harness 18 is provided with means 22 for enhancing visibility at night. Of course, the unshown lap belt can also include similar means for night visibility; however, it would have less value than being associated with the shoulder harness 18.

Some embodiments of the present invention are illustrated in the fragmentary drawings of FIGS. 2 through 4. In FIG. 2, for example, the invention 10 is depicted as a conventional fabric shoulder harness belt 18A to which is attached a material 24 that can be easily seen at night. This material 24, which can be reflective, fluorescent or phosphorescent, can be attached to the conventional harness belt 18A by any suitable means, such as with stitching shown at 26. Alternatively, it can be glued or otherwise bonded upon the surface of the belt 18A. Further, it can be "painted" upon the surface of the belt 18A. While the entire length of the shoulder belt 18A can have this material 24 thereon, it is primarily needed in a region from mid-chest to proximate the fastening at the vehicle side wall (when worn) for it is in this region that it can be most easily seen by a law enforcement officer.

Another embodiment of the present restraint 10 is illustrated in FIG. 3. In this embodiment, a fabric shoulder harness belt 18B includes threads 28 of a reflective, fluorescent and/or phosphorescent material throughout at least a portion of the belt 18B. Indicated by phantom lines 30, 32 are the outer boundaries of the portion having such threads 28. It will be understood, however, that the threads 28 can be throughout the entire width of the belt 18B. In the alternative, the threads 28 can be only in the regions outside of the lines 30, 32. As with the embodiment of FIG. 2, the threads 28 can extend any selected length along the belt 18B so that they appear in a "sensitive" area of the restraint where best seen.

FIG. 4 illustrates a portion of still another embodiment of the present restraint 10. In this embodiment, a fabric shoulder harness belt 18C is provided with at least one fiber optic element 34. In the preferred form, however, there are a plurality of such fiber optic elements. Any such fiber optic element terminates at an end of the belt 18C such that light from a light source 36 can enter. Then, by having surface discontinuities along the fiber optic element 34, light will "escape" so as to be seen by an observer. The wave length of the light, or a filter, can be chosen to provide a selected color as desired. Although not shown, the light source 36 would include some type of switch, either manual or automatic, such that the light source can be energized only at night.

From the foregoing it will be understood by persons skilled in the art that a vehicle restraint system has been provided that can be easily seen at night. With this invention, compliance with safety regulations can be ascertained by occupants of the vehicle as well as by law enforcement officers. In certain of the embodiments, "illumination" is achieved by light being directed upon the restraint (for reflective and phosphorescent materials incorporated therewith). Other embodiments utilize continuous light generation via natural fluorescence or light transmission via fiber optic technology.

Although certain embodiments have been described herein, these are for illustration purposes only and not for a limiting of the present invention. Rather, the invention is to be limited only by the appended claims and their equivalents.

I claim:

1. An occupant restraint for use in vehicles that provides night visibility of said restraint to assist in ascertaining use of said restraint by the occupant, said restraint including at least a shoulder harness retained in a conventional manner on the vehicle side wall with a shoulder harness retainer, said restraint comprising:

a belt member forming at least a portion of said shoulder harness; and a light producing element associated with at least a portion of said shoulder harness, said light producing element providing visibility of said belt at night, said portion of said shoulder harness extending between a mid-chest region of the occupant and said shoulder harness retainer.

2. The restraint of claim 1 wherein said light producing element is an element attached to said belt member at said portion of said belt of said shoulder harness, said attached element containing a light producing substance selected from the group consisting of reflective substances, fluorescent substances and phosphorescent substances.

3. The restraint of claim 2 wherein said light producing substance is a reflective substance.

4. The restraint of claim 1 wherein said light producing element is incorporated as an integral part of said belt.

5. The restraint of claim 4 wherein said light producing element is a thread portion of said belt.

6. The restraint of claim 5 wherein said thread portion includes a light producing substance selected from the group consisting of reflective substances, fluorescent substances and phosphorescent substances.

7. The restraint of claim 6 wherein said light producing substance is a reflective substance.

8. The restraint of claim 4 wherein said light producing element is at least one fiber optic element, said fiber optic element provided with light at one end from a selectably energizable light source.

9. An occupant restraint for use in vehicles that provides night visibility of said restraint to assist in ascertaining use of said restraint by said occupant, said restraint including at least a shoulder harness retained in a conventional manner on the vehicle side wall with a shoulder harness retainer, said restraint comprising:

a belt member forming at least a portion of said shoulder harness; and a light producing element integrally incorporated with at least a portion of said shoulder harness, said light producing element providing visibility of said belt at night, said portion of said shoulder harness extending between a mid-chest region of the occupant and said shoulder harness retainer.

10. The restraint of claim 9 wherein said light producing element is at least one thread of said belt member, said thread containing a light producing substance selected from the group consisting of reflective substances, fluorescent substances and phosphorescent substances.

11. The restraint of claim 10 wherein said light producing substance is a reflective substance.

12. The restraint of claim 9 wherein said light producing element is at least one fiber optic element incorporated into said belt, said fiber optic element provided with light at one end from a selectably energized light source.

13. The restraint of claim 9 wherein said portion of said belt is a portion normally positioned between a waist and a shoulder of the occupant when worn by the occupant.

14. An occupant restraint for use in vehicles that provides night visibility of said restraint to assist in ascertaining use of said restraint by said occupant, said restraint including at least a shoulder harness retained in a conventional manner on the vehicle side wall with a shoulder harness retainer, said restraint comprising:

a belt member forming at least a portion of said shoulder harness; and a light reflecting substance associated with threads integrally incorporated in at least a portion of said shoulder harness that is normally positioned between a waist and a shoulder of the occupant, said light reflecting substance providing visibility of said belt at night, said portion of said shoulder harness extending between a mid-chest region of the occupant and said shoulder harness retainer.

* * * * *